United States Patent
Van De Sluis et al.

(10) Patent No.: US 11,856,675 B2
(45) Date of Patent: Dec. 26, 2023

(54) PROVIDING A NOTIFICATION FOR A LIGHTING DEVICE WITHOUT USER-SPECIFIED POWER-SWITCH BEHAVIOR

(71) Applicant: SIGNIFY HOLDING B.V., Eindhoven (NL)

(72) Inventors: Bartel Marinus Van De Sluis, Eindhoven (NL); Mustafa Tolga Eren, Eindhoven (NL); Dzmitry Viktorovich Aliakseyeu, Eindhoven (NL); Berent Willem Meerbeek, Veldhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 88 days.

(21) Appl. No.: 17/615,599

(22) PCT Filed: May 18, 2020

(86) PCT No.: PCT/EP2020/063853
§ 371 (c)(1),
(2) Date: Dec. 1, 2021

(87) PCT Pub. No.: WO2020/244917
PCT Pub. Date: Dec. 10, 2020

(65) Prior Publication Data
US 2022/0353976 A1   Nov. 3, 2022

(30) Foreign Application Priority Data
Jun. 3, 2019 (EP) ..................... 19177805

(51) Int. Cl.
*H05B 47/19* (2020.01)
*H05B 47/165* (2020.01)

(52) U.S. Cl.
CPC ........... *H05B 47/19* (2020.01); *H05B 47/165* (2020.01)

(58) Field of Classification Search
CPC .... H05B 47/19; H05B 47/165; H05B 47/175; Y02B 20/40
See application file for complete search history.

(56) References Cited

U.S. PATENT DOCUMENTS 10,477,653 B2 * 11/2019 Krajnc ................... H05B 47/16
10,852,705 B1 * 12/2020 Conley ................ G05B 19/042
(Continued)

FOREIGN PATENT DOCUMENTS

EP   3333868 A1   6/2018
EP   3427549 B1   11/2019
(Continued)

OTHER PUBLICATIONS https://huehomelighting.com/new-power-feature-to-retain-color-when-turned-back-on/ published Dec. 13, 2018.

*Primary Examiner* — Raymond R Chai (57) ABSTRACT

The invention relates to a system (1) for assisting a user in configuring a lighting system (10), in which the lighting system comprises a lighting device (15-17) and a switch (34,35) for providing power to the lighting device. The system is configured to receive at least one signal, determine from the at least one signal that the lighting device has recently been power switched, and determine whether a user-defined power-switch light setting has been set for the lighting device. The power-switch light setting is a light setting that is activated when the lighting device is power switched. The system is further configured to provide a notification to a user in dependence on the lighting device having recently been power switched and no user-defined power-switch light setting having been set for the lighting
(Continued)

device. The notification recommends the user to set the user-defined power-switch light setting for the lighting device.

15 Claims, 4 Drawing Sheets

(56) References Cited

U.S. PATENT DOCUMENTS

| | | |
|---|---|---|
| 2016/0174345 A1 | 6/2016 | Kelly et al. |
| 2016/0286633 A1 | 9/2016 | Juslen |
| 2019/0236929 A1* | 8/2019 | Ramirez ............... H04L 67/125 |
| 2021/0144836 A1* | 5/2021 | Krajnc ................. H05B 47/175 |

FOREIGN PATENT DOCUMENTS

| | | |
|---|---|---|
| WO | 2018037002 A1 | 3/2018 |
| WO | 2018137868 A1 | 8/2018 |

* cited by examiner

PROVIDING A NOTIFICATION FOR A LIGHTING DEVICE WITHOUT USER-SPECIFIED POWER-SWITCH BEHAVIOR

CROSS-REFERENCE TO PRIOR APPLICATIONS

This application is the U.S. National Phase application under 35 U.S.C. § 371 of International Application No. PCT/EP2020/063853, filed on May 18, 2020, which claims the benefit of European Patent Application No. 19177805.9, filed on Jun. 3, 2019. These applications are hereby incorporated by reference herein.

FIELD OF THE INVENTION

The invention relates to a system for assisting a user in configuring a lighting system, said lighting system comprising a lighting device and a switch for providing power to said lighting device.

The invention further relates to a method of assisting a user in configuring a lighting system, said lighting system comprising a lighting device and a switch for providing power to said lighting device.

The invention also relates to a computer program product enabling a computer system to perform such a method.

BACKGROUND OF THE INVENTION

In connected lighting systems such as the Philips Hue system, a user is able to configure multiple light scenes for his lighting device(s) and switch between light scenes. In the Philips Hue system, the user can configure light scenes with the Philips Hue app.

WO 2018/037002 A1 discloses a method and apparatus for controlling a lighting system for providing illumination of a space, in which detected inputs or triggers give rise to updated illumination settings or patterns of illumination. A determination is made as to whether such an update should be applied automatically, or whether confirmation from a user should be sought before making any changes. If a proposed change is accepted a sufficiently high percentage of the time, or a particular number of times, the metric may be increased so that the change becomes automatic in future. If, however, a change to turn on a light when a particular user enters a room is applied automatically, but the user consistently turns the light back off quickly, the associated confidence metric is reduced, so that the change is only recommended in future US2016/174345 A1 discloses a networked light switch that, in response to detecting a local input or motion, transmits a communication that causes another light switch to change a state of a light. In an embodiment, a user interface is provided for configuring light scenes. When configuring a light scene, a current value or a suggested value may be displayed for each attribute of the light scene.

The default behavior of a typical connected light device, when it is supplied with power, is that it will start up at its default factory configured power on color (typically 2700K white light). The Zigbee Lighting & Occupancy Device Specification version 1.0 specifies a StartUpOnOff attribute that defines the desired startup behavior of a light device when it is supplied with power. When the StartUpOnOff attribute is set to the value 0xff, the light source(s) of the light device are activated (turned on) if they were on before the power was last turned off and not activated if they were off before the power was last turned off.

In a Philips Hue system, a user is able to use the Hue app to select whether he wants a lighting device to start up with the last used color and light output level or use a default color and light output level. However, since most users are not aware of this possibility, they may never configure this.

SUMMARY OF THE INVENTION

It is a first object of the invention to provide a system, which is able to help increase the number of lighting devices which have been configured with a user-defined power-switch light setting.

It is a second object of the invention to provide a method, which can be used to help increase the number of lighting devices which have been configured with a user-defined power-switch light setting.

In a first aspect of the invention, a system for assisting a user in configuring a lighting system, said lighting system comprising a lighting device and a switch for providing power to said lighting device, comprises at least one input interface, at least one output interface, and at least one processor configured to use said at least one input interface to receive at least one signal, determine from said at least one signal that said lighting device has recently been power switched, determine whether a user-defined power-switch light setting has been set for said lighting device, said power-switch light setting being a light setting that is activated when said lighting device switches from an unpowered state to a powered state, and use said at least one output interface to provide a notification to a user in dependence on said lighting device having recently been power switched and no user-defined power-switch light setting having been set for said lighting device, said notification recommending said user to set said user-defined power-switch light setting for said lighting device and/or for one or more further lighting devices associated with said lighting device.

Since most users are not aware of the possibility of defining a power-switch light setting, they may never do this unless they are notified about this possibility at the right moment. This notification is therefore provided in dependence on the lighting device having recently been power switched. Such a notification is only effective if it is only provided for lighting devices for which no user-defined power-switch light setting has been set yet. A lighting device is being power switched when it switches from an off state to an on or standby state or switches from an on or standby state to an off state. In other words, a lighting device is being power switched when it switches from an unpowered state (i.e. unpowered by mains power) to a powered state (i.e. powered by mains power) or from a powered state (i.e. powered by mains power) to an unpowered state (i.e. unpowered by mains power).

The power-switch light setting may be a start-up light setting or a power-down light setting. A start-up light setting may be activated when the lighting device is switched on and a power-down light setting may be activated when the lighting device is switched off. The same power-switch light setting may be used for the lighting device and the further lighting devices or a different power-switch setting (or settings) may be used for the further lighting devices than for the lighting device. A power-down light setting may cause the further lighting devices to turn off their light source or activate a night light mode, for example. The lighting device itself can only use the power-switch light setting if it is able to access another power source, e.g. a battery, when powering down.

Said at least one processor may be configured to provide said notification within a predefined time after said at least one signal has been received. The right moment to notify the user about the possibility of defining a power-switch light setting is just after a lighting device has been power switched, e.g. upon receiving the at least one signal, or shortly thereafter.

Said at least one processor may be configured to provide said notification upon said user controlling said lighting device and/or accessing a lighting configuration function. Although the notification may be provided just after a lighting device has been power switched, even if the user is not using an app for controlling or configuring his lighting device(s), this may be considered to be obtrusive and/or may easily be ignored by the user, because the user is doing something else. By providing the notification when the user controls the lighting device and/or accesses a lighting configuration function, the user may be more likely to define the power-switch light setting.

Said at least one processor may be configured to provide said notification upon said user controlling said lighting device according to a user-specified light setting and wherein said notification recommends said user-specified light setting as a specific power-switch light setting for said lighting device. When the user controls the lighting device with a certain light setting, this light setting may be considered to be an acceptable light setting and therefore recommended to the user as power-switch light setting if he has not defined one already and the lighting device has recently been power switched.

Said at least one processor may be configured to provide said notification in dependence on said user controlling said lighting device and/or accessing said lighting configuration function within a predefined time after said lighting device has been power switched. If the lighting device was power switched too long ago, it may be more difficult for the user to realize fully what the advantage is of defining a power-switch light setting, or the user may no longer make use of the switch, making the recommendation unnecessary.

Said at least one signal may comprise a signal which indicates whether said lighting device has recently been power switched. Said signal may originate from said lighting device and may be received directly from the lighting device or via a light bridge, for example. When the lighting devices transmits such a signal, it is easy to make sure that the lighting device has been power switched and is not merely unreachable for a while. The time at which the at signal is received may be used as time at which the lighting device has been power switched. Alternatively, the signal may indicate at which time the lighting device was power switched.

Said at least one signal may comprise a first set of signals received from said lighting device in a first period and a second set of signals received from said lighting device in a second period, said first period and said second period being separated by an intermediate period in which no signals are received from said lighting device, and said at least one processor may be configured to determine whether a signal strength of said at least one signal exceeds a predefined threshold, determine that said lighting device has recently been power switched upon receiving said second set of signals in dependence on said signal strength exceeding said predefined threshold. In this way, it may be possible to distinguish between a user using a legacy switch (power cut) and the lamp being unreachable e.g. due to ZigBee issues. Additionally or alternatively, historic usage data and/or input with regards to the current situation (e.g. user presence, user position, time-of-day, ambient lighting conditions) may be used to make this distinction.

Said notification may further recommend said user to set a user-defined power-switch light setting for one or more further lighting devices associated with said lighting device. Although the user-defined power-switch light setting is normally a single light setting for a single lighting device, it may be extended to activation of a complete light scene on multiple lighting devices, e.g. involving all lamps in a room group and applying a different color to each lamp.

Said at least one processor may be configured to determine which light setting is frequently used by said lighting device and said notification may recommend said frequently-used light setting. If the recommendation is not provided when the user controls the lighting device, e.g. is provided by a push notification just after the lighting device has been power switched, it is beneficial to recommend a frequently-used light setting.

Said notification may recommend a specific light setting for said lighting device and said at least one processor may be configured to configure said lighting device with said specific light setting upon receiving user input accepting said recommendation. This makes it especially easy for a user to configure the lighting device with a user-defined power-switch light setting and therefore helps increase the number of lighting devices which have been configured with a user-defined power-switch light setting. The specific light setting may be the light setting that the user has selected for controlling the lighting device or a frequently-used light setting, for example.

Said notification may recommend one or more further specific light settings for one or more further lighting devices associated with said lighting device and said at least one processor may be configured to configure said one or more further lighting devices with said one or more further specific light settings. The above-mentioned further lighting devices, e.g. involved in the same light scene, may be configured automatically as well and this therefore helps increase the number of lighting devices which have been configured with a user-defined power-switch light setting.

Said at least one processor may be configured to configure said lighting device, said system or a further device to control, upon determining that said lighting device has recently been power switched, one or more further lighting devices associated with said lighting device according to one or more light settings. This may be used, for example, if it not possible or desirable to configure all lighting devices involved in a light scene with a user-defined power-switch light setting in the lighting device itself. For instance, if a user-defined power-switch light setting has not been configured in one of the further lighting devices, the lighting device or a light bridge may still be able to realize a similar behavior by having the lighting device or light bridge control this further lighting device with a user-defined power-switch light setting stored in the lighting device or light bridge upon determining that the lighting device has recently been power switched.

This may alternatively or additionally be used, for example, if power-switch light settings of the further lighting devices should be activated when the lighting device is power switched instead of or in addition to when the further lighting devices themselves are power switched. A power-switch light setting recommended to the user in the notification may comprises light settings to be used by the lighting devices itself and/or light settings to be activated on the further lighting devices. For example, when the lighting device powers down, a night light mode may be activated on the further lighting devices.

In a second aspect of the invention, a method of assisting a user in configuring a lighting system, said lighting system comprising a lighting device and a switch for providing power to said lighting device, comprises receiving at least one signal, determining from said at least one signal that said lighting device has recently been power switched, determining whether a user-defined power-switch light setting has been set for said lighting device, said power-switch light setting being a light setting that is activated when said lighting device switches from an unpowered state to a powered state, and providing a notification to a user in dependence on said lighting device having recently been power switched and no user-defined power-switch light setting having been set for said lighting device, said notification recommending said user to set said user-defined power-switch light setting for said lighting device. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for assisting a user in configuring a lighting system, said lighting system comprising a lighting device and a switch for providing power to said lighting device.

The executable operations comprise receiving at least one signal, determining from said at least one signal that said lighting device has recently been power switched, determining whether a user-defined power-switch light setting has been set for said lighting device, said power-switch light setting being a light setting that is activated when said lighting device is power switched, and providing a notification to a user in dependence on said lighting device having recently been power switched and no user-defined power-switch light setting having been set for said lighting device, said notification recommending said user to set said user-defined power-switch light setting for said lighting device.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
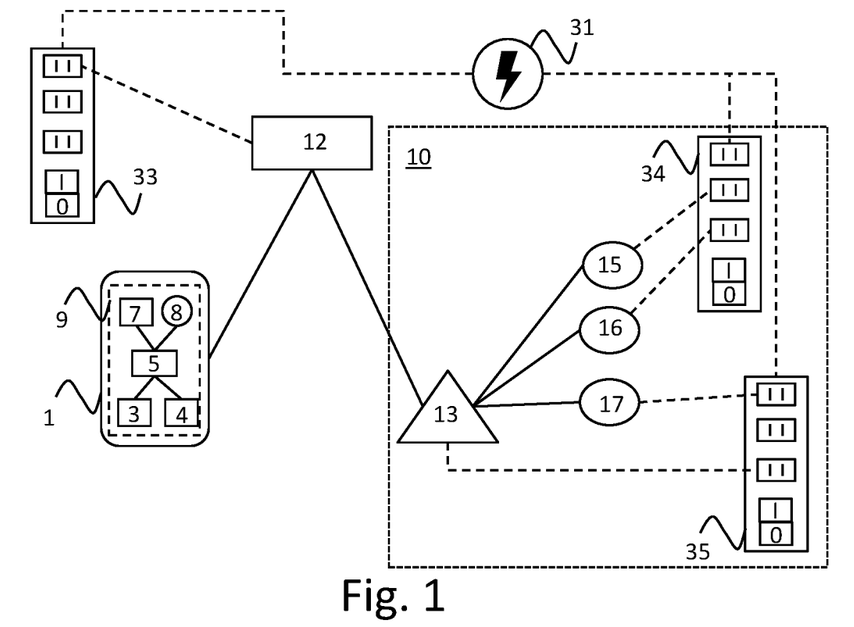
FIG. 1 is a block diagram of a first embodiment of the system.

FIG. 1 shows a first embodiment of the system for assisting a user in configuring a lighting system. The lighting system 10 of FIG. 1 comprises lighting devices 15-17, power switches 34 and 35 for providing power to the lighting devices 15-17 and a bridge 13. In the embodiment of FIG. 1, the system is a mobile device 1.

The mobile device 1 is connected to a wireless LAN access point 12. The bridge 13, e.g. a Philips Hue bridge, is also connected to the wireless LAN access point 12, e.g. via Ethernet. The bridge 13 communicates with the lighting devices 15-17, e.g. using Zigbee technology. The lighting devices 15-17 may be Philips Hue lights, for example. The lighting devices 15 and 16 are coupled to power switch 34. The lighting device 17 and the bridge 13 is coupled to power switch 35. The wireless LAN access point 12 is coupled to a power switch 33. The power switches 33-35 are connected to mains power 31.

The mobile device 1 comprises a receiver 3, a transmitter 4, a processor 5, memory 7, a camera 8 and a display 9. The processor 5 is configured to use the receiver 3 to receive at least one signal, determine from the at least one signal that at least one of the lighting devices 15-17 has recently been power switched and determine whether a user-defined power-switch light setting has been set for this at least one lighting device. The power-switch light setting is a light setting that is activated when the at least one lighting device switches from an unpowered state to a powered state.

The processor 5 is further configured to use the display 9 to provide a notification to a user in dependence on the at least one lighting device having recently been power switched and no user-defined power-switch light setting having been set for the at least one lighting device. The notification recommends the user to set the user-defined power-switch light setting for the at least one lighting device.

In the embodiment of FIG. 1, the notification recommends a specific light setting for the lighting device(s) that have recently been power switched and for which no power-switch light setting has been set. After the processor 5 of the mobile device 1 has used the display 9 to provide the notification, the processor 5 uses the display 9 to ask the user whether he accepts the recommended specific light setting (s). If the user accepts the recommendation, e.g. by pressing a virtual button on display 9 if display 9 is a touch screen, then the processor 5 uses the transmitter 4 to configure this lighting device or these lighting devices.

In the embodiment of FIG. 1, the at least one signal comprises a signal which indicates whether the at least one lighting device has recently been power switched and this signal originates from the at least one light device. In the embodiment of FIG. 1, the lighting devices 15-17 transmit a signal after being power switched indicating that they have been power switched. The lighting devices 15-17 transmit this signal to the mobile device 1 via the bridge 13. In an alternative embodiment, the at least one lighting device transmits this signal to the mobile device 1 directly.

In the embodiment of FIG. 1, it is the lighting device itself that is able detect and report on events. For instance, after a lighting device temporarily loses its (e.g. Zigbee) connection to the bridge, upon reconnecting, it will inform the bridge that it temporary lost its connection ("just reconnected") while remaining powered. In a similar way, the lighting device may have the means to detect that it has been power switched. For instance, upon powering up again, the lighting device may inform the bridge ("just powered on"). In cases that the lighting device is equipped with a capacitor or battery, the lighting device could also report upon being switched off ("just powered off"). Thus, the lighting device will know whether it was a power off or a disconnect. Using the reporting principle described above, the bridge can be informed.

For example, if the power switch 34 is switched off and later switched on again, the lighting devices 15 and 16 reboot after receiving power. After rebooting, lighting devices 15 and 16 transmit a signal indicating that they have rebooted to the bridge 13. The bridge 13 then forwards this signal to the mobile device 1, which is connected to the bridge 13. After receipt of the signal, the mobile device 1 checks if a power-switch light setting has been set for the lighting devices 15 and 16, e.g. with the bridge 13 or with the lighting devices 15 and 16 themselves. If not, then the mobile device 1 waits for the user to control the lighting device 15 or 16 or access a configuration function before showing the notification or pushes the notification to the user immediately.

In an alternative embodiment, the reported data can be used as training data to create a model. This model can be used to determine whether a connection loss is caused by a power switch event. Real-time data and/or historical data may be used to make this determination. Real-time data may comprise the above-mentioned signals transmitted by the user's own lighting devices, but real-time data may also comprise signals transmitted by lighting devices of neighbors. For example, if a signal of a certain lighting device of a neighbor can still be received, it may be considered likely that an unreachable lighting device of the user does not receive power.

Historical data may be data representing or based on behavior of users, for example. The historical data may be personal, e.g. of the user(s) of the lighting devices 15-17, and/or global, i.e. of users of lighting devices in general. For example, if historical data indicates that the user(s) of the lighting devices 15-17 or users of lighting devices in general often power switch a certain type of lighting device late in the evening, this data may be used to determine that a lost connection to this type of lighting device late in the evening is likely a power switch event and not caused by a connection problem. Typically, power on behavior depends on time and is different at night.

In the embodiment of the mobile device 1 shown in FIG. 1, the mobile device 1 comprises one processor 5. In an alternative embodiment, the mobile device 1 comprises multiple processors. The processor 5 of the mobile device 1 may be a general-purpose processor, e.g. from ARM or Qualcomm or an application-specific processor. The processor 5 of the mobile device 1 may run an Android or iOS operating system for example. The display 9 may comprise an LCD or OLED display panel, for example. The display 9 may be a touch screen, for example. The processor 5 may use this touch screen to provide a user interface, for example. The memory 7 may comprise one or more memory units. The memory 7 may comprise solid state memory, for example.

The receiver 3 and the transmitter 4 may use one or more wireless communication technologies such as Wi-Fi (IEEE 802.11) to communicate with the wireless LAN access point 12, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The camera 8 may comprise a CMOS or CCD sensor, for example. The mobile device 1 may comprise other components typical for a mobile device such as a battery and a power connector. The invention may be implemented using a computer program running on one or more processors.

In the embodiment of FIG. 1, a bridge is used to control light devices 15-17. In an alternative embodiment, light devices 15-17 are controlled without using a bridge. In the embodiment of FIG. 1, the system is a mobile device. In an alternative embodiment, the system of the invention is a different device, e.g. a bridge. In the embodiment of FIG. 1, the system of the invention comprises a single device. In an alternative embodiment, the system of the invention comprises a plurality of devices.

Figure 2:
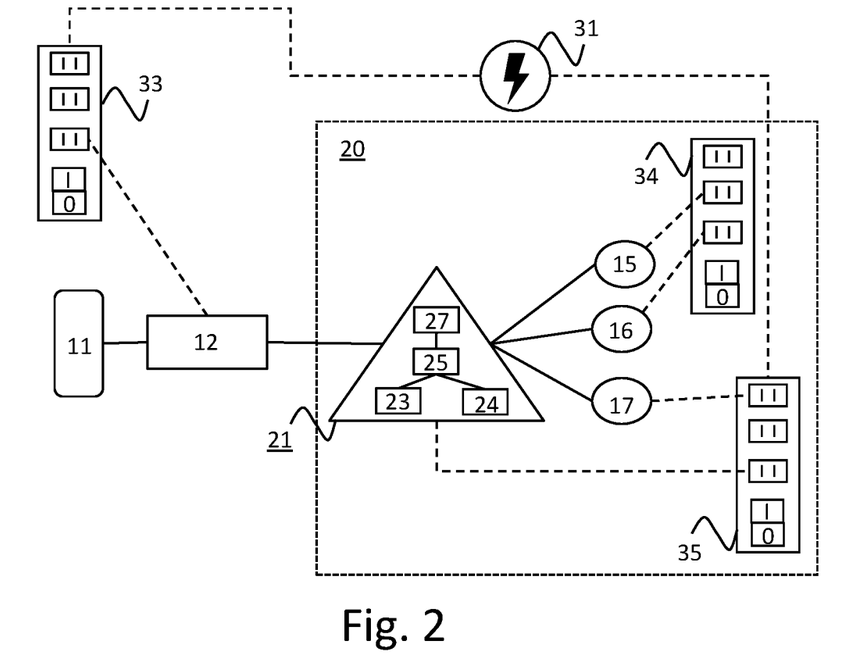
FIG. 2 is a block diagram of a second embodiment of the system.

FIG. 2 shows a second embodiment of the system for assisting a user in configuring a lighting system: a bridge 21, e.g. a Philips Hue bridge. The bridge 21, the lighting devices 15-17 and the switches 34 and 35 are part of a lighting system 20. The bridge 21 comprises a receiver 23, a transmitter 24, a processor 25, and a memory 27.

The processor 25 is configured to use the receiver 23 to receive at least one signal, determine from the at least one signal that at least one of the lighting devices 15-17 has recently been power switched, and determine whether a user-defined power-switch light setting has been set for the at least one lighting device. The power-switch light setting is a light setting that is activated when the at least one lighting device is power switched.

The processor 25 is further configured to use the transmitter 24 to provide a notification to a user in dependence on the at least one lighting device having recently been power switched and no user-defined power-switch light setting having been set for the at least one lighting device. The notification recommends the user to set the user-defined power-switch light setting for the lighting device. In the example of FIG. 2, the notification is provided to the user via a mobile device 11 of the user.

In the embodiment of FIG. 1, the lighting devices 15-17 transmit signals after being power switched indicating that they have been power switched. In the embodiment of FIG. 2, the lighting devices 15-17 do not transmit this kind of signal. In order to determine whether a lighting device has recently been power switched, the processor 25 is configured to analyze connected lighting system usage data to determine that a user power switched one or more lighting devices using a power switch (e.g. using a legacy wall switch or an on-luminaire power switch).

A dedicated analysis may be performed in order to distinguish (temporary) connectivity failures from the connected lighting device losing its power. This can be done, for example, through temporal analysis of the RF signal strength of the lighting devices. For lighting devices that typically have a strong RF signal and suddenly drop to no signal, it can be assumed they have been powered off. Other lighting devices might generally have a weaker signal strength and regularly become unreachable, indicating they might be on the boundary of the detection range.

In the embodiment of FIG. 2, the at least one signal received by the processor 25 comprises a first set of signals received from the at least one lighting device, e.g. lighting devices 15 and 16, in a first period and a second set of signals received from the at least one lighting device in a second period. The first period and the second period are separated by an intermediate period in which no signals are received from the at least one lighting device. This intermediate period is, for example, the period during which the switch 34 is switched off.

The processor 25 is configured to determine whether a signal strength of the at least one signal exceeds a predefined threshold and determine that the at least one lighting device has recently been power switched upon receiving the second set of signals in dependence on the signal strength exceeding the predefined threshold. For example, if the signal strength of transmissions by lighting devices 15 and 16 before and after an intermediate period without transmissions by lighting devices 15 and 16 is high, then the lighting devices 15 and 16 were likely turned off during the intermediate period.

On the other hand, if the signal strength of transmissions by lighting devices 15 and 16 before and after the intermediate period was low, then there was likely a connection problem and lighting devices 15 and 16 were likely not turned off during the intermediate period.

Additional information may be used to increase the reliability of the determination whether a lighting device has recently been power switched. A reliability of the power switch determination may be estimated, and the notification may be provided in dependence on this reliability. For example, if the reliability is estimated to be 50%, a 50% probability of providing the notification may be used.

Various other detected inputs may further help to provide an indication that the connected lighting device was actually power switched if at the moment the connection was lost or re-established:
- the room just went dark or a change in light level was detected immediately after the power switch (e.g. as detected by light sensor)
- a user was detected to be present
- a user was detected who just arrived home or entered the room
- other nearby connected devices where activated almost simultaneously. In a similar way, power switches performed by a user may be distinguished from a general power-cut, as many other devices would switch off at exactly the same time in the latter case. A different notification message be provided depending on whether a lighting device was turned off because of a general power cut or not.

Optionally, in case of a multi-user lighting system, it may be possible to identify the user performing the power switching based on the above data.

In the embodiment of the bridge 21 shown in FIG. 2, the bridge 21 comprises one processor 25. In an alternative embodiment, the bridge 21 comprises multiple processors. The processor 25 of the bridge 21 may be a general-purpose processor, e.g. ARM-based, or an application-specific processor. The processor 25 of the bridge 21 may run a Unix-based operating system for example. The memory 27 may comprise one or more memory units. The memory 27 may comprise one or more hard disks and/or solid-state memory, for example. The memory 27 may be used to store a table of connected lights, for example.

The receiver 23 and the transmitter 24 may use one or more wired or wireless communication technologies such as Ethernet to communicate with the wireless LAN access point 12, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 23 and the transmitter 24 are combined into a transceiver. The bridge 21 may comprise other components typical for a network device such as a power connector. The invention may be implemented using a computer program running on one or more processors.

Figure 3:
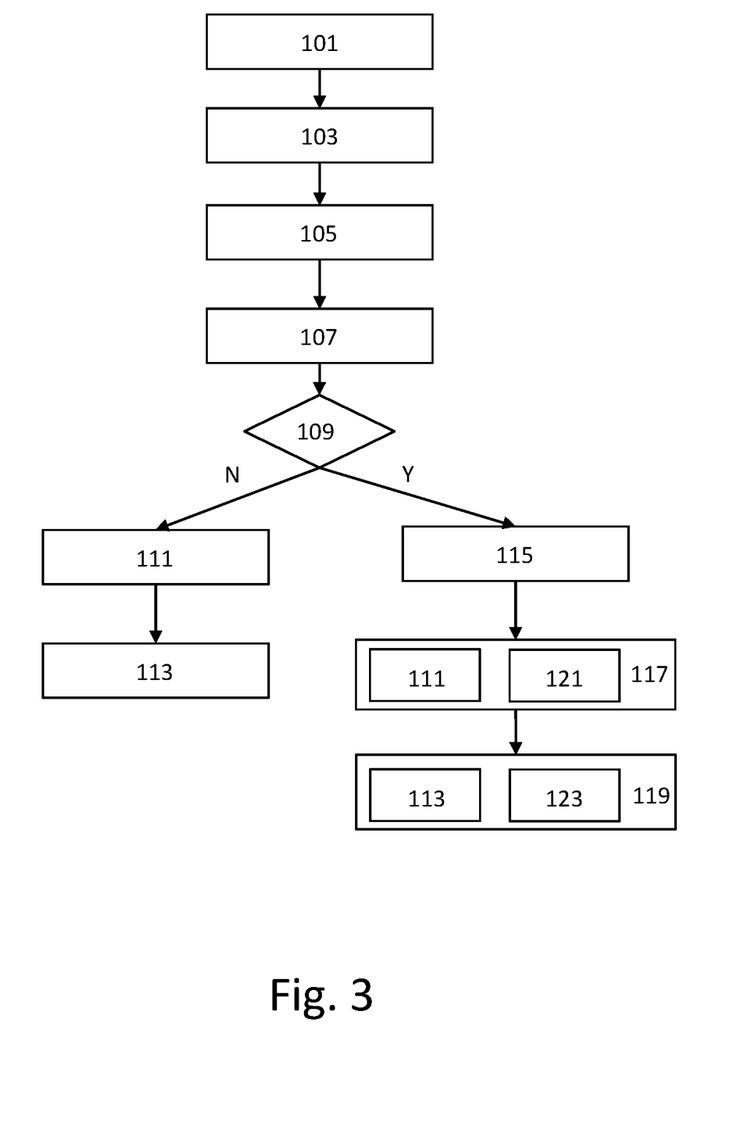
FIG. 3 is a flow diagram of a first embodiment of the method.

A first embodiment of the method of assisting a user in configuring a lighting system is shown in FIG. 3. The lighting system comprising a lighting device and a switch for providing power to the lighting device. A step 101 comprises receiving at least one signal. A step 103 comprises determining from the at least one signal that the lighting device has recently been power switched. A step 105 comprises determining whether a user-defined power-switch light setting has been set for the lighting device. The power-switch light setting is a light setting that is activated when the lighting device is power switched.

A step 107 comprises determining which light setting is frequently used by the lighting device. Next, a step 109 is performed. Step 109 comprises determining whether a further lighting device has been associated with the lighting device, e.g. whether one or more further lighting devices have been assigned to the same room as the lighting device. If not, step 111 is performed next.

A step 111 comprises providing a notification to a user in dependence on the lighting device having recently been power switched and no user-defined power-switch light setting having been set for the lighting device. The notification recommends the user to set a user-defined power-switch light setting for the lighting device. In the embodiment of FIG. 3, the notification recommends the frequently used light setting determined for the lighting device in step 107 as power-switch light setting.

In the embodiment of FIG. 3, the notification is provided immediately after receiving the at least one signal in step 101. The notification may be provided to the person or persons who have installed the lighting control app on their mobile device when they are at home, e.g. when their mobile devices are connected to the same wireless network as the light bridge. If the notification can be provided to multiple persons, one of them may be selected based on his location (e.g. the location of his mobile device), e.g. the notification may be provided to the person closest to the power-switched lighting device. The notification may also be provided to the user via a smart speaker such as the Amazon Echo or Google Home or other voice assistant, e.g. if the smart speaker is near the lighting device being power-switched.

In an alternative embodiment, the notification may be provided later, but within a predefined time after the at least one signal has been received, e.g. within several hours. This predefined time may be pre-configured and/or user-configurable. In this alternative embodiment, a voice assistant could provide the notification as soon as a person powers switches the lighting device(s), or at the moment when user gives a command to the voice assistant to change the light setting in the same space. A step 113 comprises configuring the lighting device with the frequently used light setting determined in step 105 upon receiving user input accepting the recommendation.

If one or more further light devices have been associated with the lighting device, step 115 is performed after step 109. Step 115 comprises determining which light settings are frequently used by the one or more further lighting devices. A step 117 is performed after step 115. Step 117 comprises step 111 and a step 121 as sub steps.

Step 117 comprises providing a notification to a user in dependence on the lighting device having recently been power switched and no user-defined power-switch light setting having been set for the lighting device. In the embodiment of FIG. 3, in step 111, the notification recommends the user to set the frequently used light setting determined in step 107 as power-switch light setting for the lighting device. In step 121, the notification further recommends the user to set the one or more frequently used light settings determined in step 115 as power-switch light settings for the one or more further lighting devices.

A step 119 is performed after step 117. Step 119 comprises configuring the lighting device and the one or more further lighting devices upon receiving user input accepting the recommendation. Step 119 comprises step 113 and a step 123 as sub steps. Step 113 comprises configuring the lighting device with the frequently used light setting determined in step 105. Step 123 comprises configuring the one or more further lighting devices with the one or more frequently used light settings determined in step 115.

The recommendation provided in steps 111 and 117 may be provided by a lighting control app, for example as a push message, a message on the app's home screen. It is also possible to present the recommendation in a spoken dialogue, e.g. on a connected Smart Speaker Assistant device (Google Home, Amazon Alexa). The message provided to the user may depend on whether the user has already set a power-switch light setting for another lighting device or not.

Figure 4:
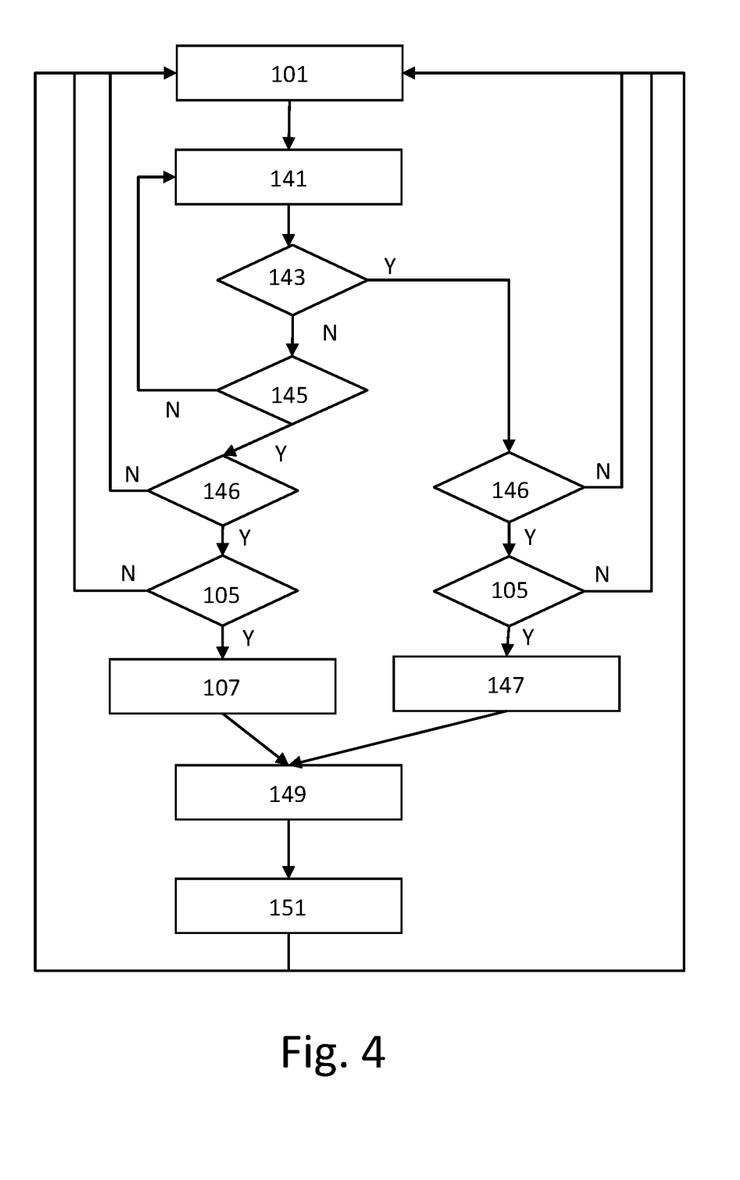
FIG. 4 is a flow diagram of a second embodiment of the method.

The user may be recommended to define a user-defined power-switch light setting for the lighting device only (step 111) or to define a user-defined power-switch light setting for the lighting device and its associated lighting devices (e.g. lighting devices nearby or in the same room group) (step 117). In the embodiment of FIG. 4, a frequently used light setting is suggested. This light setting may, for example, be frequently used by the user who is using the lighting control app or who is associated with the lighting device or light bridge and optionally by users with similar characteristics. This light setting may be frequently used at similar times or at all times.

The associated lighting devices do not have to be on the same power circuit as the first lighting device. So, the associated lighting devices become controllable with a legacy switch, even without it being physically connected to the power-line of this switch. If it is detected that some of the associated lighting devices are operated by a different power switch (e.g. based on the historical data), a different power-switch light setting could be recommended for these lighting devices, especially if they are sometimes used in a different scenes/light groups.

In the embodiment of FIG. 3, the recommendation provided in steps 111 and 117 comprises a complete proposal to automate light scene activation upon detecting the power switch event for the lighting device, and the user only needs to reject or confirm the proposed automation rule.

In an alternative embodiment, the user is presented with selectable favorite or frequently used light settings for the lighting device and/or light settings for other lighting devices nearby or in the same (room) group. In this way, the user can simply select the light setting he wishes to activate the next time the lighting device is power switched. The user may also be allowed to define a new light setting or scene.

In steps 113 and 123, upon receiving confirmation from the user, the power-switch light setting for the lighting device (and associated lighting devices) is stored. In the embodiment of FIG. 3, this happens in the involved (power-switched) lighting device(s), such that they can instantly activate the power-switch light setting upon being power switched. In the case that a personal power-switch light setting is stored, the user identity is stored along with the preference. In that case, besides detecting the power switch command, the user's presence nearby the light switch or switched lighting device is determined, for instance, by identifying the user based on his personal device. In an alternative embodiment, the power-switch light setting is additionally or alternatively stored in a light bridge.

Upon a power switch for the lighting device which has the stored power-switch light setting, the lighting device activates the stored light setting. In an alternative embodiment, it might be that the power-cycled lighting device sends a message via a mesh network (e.g. ZigBee) to the associated lighting devices to inform them to activate the user-defined power-switch, e.g. start-up, behavior.

After the power-switch light setting has been stored, the lighting control app (e.g. Hue app) may provide an indication of an associated power-switch light setting. For instance, in the lights list (overview of connected lighting devices per room), this could be indicated for each connected lighting device which has a power-switch light setting defined. In addition, if associated lighting devices are activated upon power-on as well, those lighting devices and their associated power-switch light settings may be presented here as well.

In the case the power-switch light scene is defined for all lighting devices in a particular room group, the defined power-switch light scene may be shown in the list of scenes for that room group. In the case that an existing light scene is selected and associated with the power switch event, an (extra) indication may be shown indicating that this light scene also is used as power-switch light setting for one (or more) power-switched lighting devices in the room.

A second embodiment of the method of assisting a user in configuring a lighting system is shown in FIG. 4. Step 101 comprises receiving at least one signal. A step 141 comprises receiving user input. A step 143 comprises checking whether this user input represents a user command to control a lighting device. If so, steps 146, 105 and 147 are performed next. If not, step 145 is performed next. Step 145 comprises checking whether said user input represents a user command to access a configuration function. If so, steps 146, 105 and 107 are performed next. If not, step 141 is repeated. Alternatively, step 101 may be repeated (not shown) instead of step 141.

Step 146 comprises determining from the at least one signal whether the lighting device has recently been power switched and involves determining whether step 146 is performed within a predefined time, e.g. several hours, after the lighting device has been power switched. If it is determined in step 146 that the lighting device has recently been power switched, step 105 is performed next. Step 105 comprises determining whether a user-defined power-switch light setting has been set for the lighting device. If it is determined in step 105 that a user-defined power-switch light setting has been set for the lighting device and the user input represents a user command to control a lighting device, step 147 is performed next.

Step 147 comprise determining from the user input which light setting the user wants the lighting device to render, i.e. with which user-specified lighting setting the lighting device should be controlled. If the user input represents a user command to access a configuration function, then such a light setting has not been specified and step 107 of FIG. 3 is performed after step 105 instead. Step 107 comprises determining which light setting is frequently used by the lighting device.

Step 149 is performed after steps 107 and 147. Step 149 comprises providing a notification to a user in dependence on the lighting device having recently been power switched and no user-defined power-switch light setting having been set for the lighting device. In the embodiment of FIG. 4, the notification recommends the user to set a user-defined start-up light setting for the lighting device. The light setting determined in step 107 or 147 is recommended as start-up light setting. A step 151 comprises configuring the lighting device with the light setting determined in step 107 or 147 as start-up light setting upon receiving user input accepting the recommendation. Step 101 is repeated after step 151.

In the embodiment of FIG. 4, the lighting device is configured in step 151 to render the start-up light setting or a portion thereof when it starts up. Furthermore, in step 151, the lighting device is being configured to control, upon start-up, one or more further lighting devices associated with the lighting device to render the start-up light setting or a portion thereof or a light bridge is being configured to control, upon detecting the lighting device being powered on, these one or more further lighting devices to render the start-up light setting or a portion thereof.

In an alternative embodiment, the notification does not (only) recommend setting a user-defined start-up light setting for the lighting device, but additionally or alternatively, a user-defined power-down light setting. This power-down light setting may comprise a light setting to be used by the lighting device itself (e.g. when it is able to access an alternative power source when powering down) and/or a power-down light setting to be activated on the one or more further lighting devices, e.g. a night light mode.

If the lighting device is configured to control the one or more further lighting devices, the lighting device may be referred to as master lighting device and the one or more further lighting devices may be referred to as slave lighting device(s). In an alternative embodiment, step 123 of FIG. 3 is performed for a first subset of the further lighting devices and step 151 of FIG. 4 is performed for a second subset of the further lighting devices.

Figure 5:
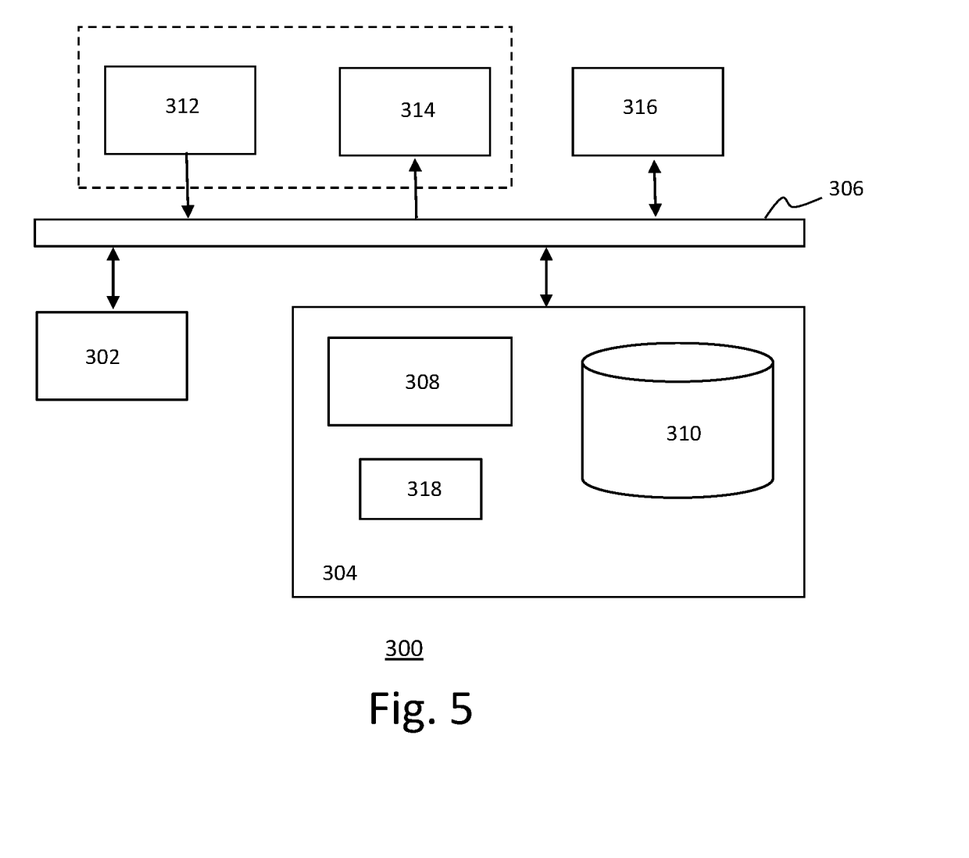
FIG. 5 is a block diagram of an exemplary data processing system for performing the method of the invention.

FIG. 5 depicts a block diagram illustrating an exemplary data processing system that may perform the method as described with reference to FIGS. 3 and 4.

As shown in FIG. 5, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 5 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 5, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 5) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for assisting a user in configuring a lighting system, said lighting system comprising a lighting device and a switch for providing power to said lighting device, said system comprising:
    at least one input interface;
    at least one output interface; and
    at least one processor configured to:
        use said at least one input interface to receive at least one signal,
        determine from said at least one signal that said lighting device has recently been power switched,
        determine whether a user-defined power-switch light setting has been set for said lighting device, said power-switch light setting being a light setting that is activated when said lighting device switches from an unpowered state to a powered state, and
        use said at least one output interface to provide a notification to a user in dependence on said lighting device having recently been power switched and no user-defined power-switch light setting having been set for said lighting device, said notification recommending said user to set said user-defined power-switch light setting for said lighting device.

2. The system of claim 1, wherein said at least one processor is configured to provide said notification within a predefined time after said at least one signal has been received.

3. The system of claim 1, wherein said at least one processor is configured to provide said notification upon said user controlling said lighting device and/or accessing a lighting configuration function.

4. The system of claim 3, wherein said at least one processor is configured to provide said notification upon said user controlling said lighting device according to a user-specified light setting and wherein said notification recommends said user-specified light setting as a specific power-switch light setting for said lighting device.

5. The system of claim 3, wherein said at least one processor is configured to provide said notification in dependence on said user controlling said lighting device and/or accessing said lighting configuration function within a predefined time after said lighting device has been power switched.

6. The system of claim 1, wherein said at least one signal comprises a signal which indicates whether said lighting device has recently been power switched.

7. The system of claim 6, wherein said signal originates from said lighting device.

8. The system of claim 1, wherein said at least one signal comprises a first set of signals received from said lighting device in a first period and a second set of signals received from said lighting device in a second period, said first period and said second period being separated by an intermediate period in which no signals are received from said lighting device, and said at least one processor is configured to:
    determine whether a signal strength of said at least one signal exceeds a predefined threshold,
    determine that said lighting device has recently been power switched upon receiving said second set of signals in dependence on said signal strength exceeding said predefined threshold.

9. The system of claim 1, wherein said notification further recommends said user to set a user-defined power-switch light setting for one or more further lighting devices associated with said lighting device.

10. The system of claim 1, wherein said at least one processor is configured to determine which light setting is frequently used by said lighting device and wherein said notification recommends said frequently-used light setting.

11. The system of claim 1, wherein said notification recommends a specific light setting for said lighting device and said at least one processor is configured to configure said lighting device with said specific light setting upon receiving user input accepting said recommendation.

12. The system of claim 11, wherein said notification recommends one or more further specific light settings for one or more further lighting devices associated with said lighting device and said at least one processor is configured to configure said one or more further lighting devices with said one or more further specific light settings.

13. The system of claim 1, wherein said at least one processor is configured to configure said lighting device, said system or a further device to control, upon determining that said lighting device has recently been power switched, one or more further lighting devices associated with said lighting device according to one or more light settings.

14. A method of assisting a user in configuring a lighting system, said lighting system comprising a lighting device and a switch for providing power to said lighting device, said method comprising:
    receiving at least one signal;
    determining from said at least one signal that said lighting device has recently been power switched;
    determining whether a user-defined power-switch light setting has been set for said lighting device, said power-switch light setting being a light setting that is activated when said lighting device switches from an unpowered state to a powered state; and
    providing a notification to a user in dependence on said lighting device having recently been power switched and no user-defined power-switch light setting having been set for said lighting device, said notification recommending said user to set said user-defined power-switch light setting for said lighting device.

15. A non-transitory storage medium comprising at least one software code portion, the software code portion, when run by at least one processor, being configured to cause the at least one processor to perform the method of claim 14.

* * * * *